(12) United States Patent
Hameed et al.

(10) Patent No.: US 10,839,390 B2
(45) Date of Patent: Nov. 17, 2020

(54) SYSTEMS AND METHODS FOR PUSHING HOSTED UNIVERSAL RESOURCE LOCATOR TO MOBILE COMPUTING DEVICES

(71) Applicant: MASTERCARD INTERNATIONAL INCORPORATED, Purchase, NY (US)

(72) Inventors: Siddique Hameed, Chesterfield, MO (US); Epher Mendoza, Wildwood, MO (US); Adam Axe, St. Louis, MO (US); Neeraj Javiya, St. Charles, MO (US); Stewart Boling, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 383 days.

(21) Appl. No.: 15/794,971

(22) Filed: Oct. 26, 2017

(65) Prior Publication Data
US 2019/0130397 A1 May 2, 2019

(51) Int. Cl.
*G06Q 20/00* (2012.01)
*G06Q 20/40* (2012.01)
(Continued)

(52) U.S. Cl.
CPC ..... *G06Q 20/401* (2013.01); *G06F 16/90335* (2019.01); *G06F 16/9566* (2019.01); *G06Q 20/12* (2013.01)

(58) Field of Classification Search
USPC .......................................................... 705/44
See application file for complete search history.

(56) References Cited

U.S. PATENT DOCUMENTS 9,311,669 B2    4/2016    Rashwan
9,436,961 B2    9/2016    Rashwan
(Continued)

OTHER PUBLICATIONS

Mobile software agent enabled e-commerce: System design and profit maximizing algorithms by Dasgupta, Prithviraj. University of California, Santa Barbara, ProQuest Dissertations Publishing, 2001. 3016380. (Year: 2001).*

(Continued)

*Primary Examiner* — Hani M Kazimi
*Assistant Examiner* — Hatem M Ali
(74) *Attorney, Agent, or Firm* — Armstrong Teasdale LLP

(57) ABSTRACT

A host system pushing hosted Universal Resource Locators (URLs) to mobile computing devices is provided. The host system includes at least one host computing device configured to receive first merchant data and first Internet of Technology (IOT) data associated with a merchant computing device, enroll the merchant computing device using the first merchant data and the first IOT data, and build an IOT device profile. The host computing device is also configured to generate a hosted URL associated with the merchant computing device and push the hosted URL, using a URL signal, to a user computing device via an IOT device. The host computing device is further configured to instruct the user computing device to convert the URL signal into a URL address and instruct the user computing device to load the URL address in a browser of the user computing device.

20 Claims, 8 Drawing Sheets

(51) Int. Cl.
    *G06F 16/903*    (2019.01)
    *G06F 16/955*    (2019.01)
    *G06Q 20/12*    (2012.01)

(56) References Cited

U.S. PATENT DOCUMENTS

| | | |
|---|---|---|
| 9,483,791 B2 | 11/2016 | Schank et al. |
| 9,524,501 B2 | 12/2016 | Weber |
| 2014/0129733 A1* | 5/2014 | Klais ................ H04L 45/22 709/239 |
| 2014/0289366 A1* | 9/2014 | Choi ................ G06F 9/4451 709/218 |
| 2015/0170132 A1 | 6/2015 | Patel |
| 2015/0278810 A1 | 10/2015 | Ramatchandirane et al. |
| 2016/0314452 A1 | 10/2016 | Pochic et al. |
| 2017/0032356 A1 | 2/2017 | Deshpande |
| 2017/0046758 A1* | 2/2017 | Sheehan ............. G06Q 20/10 |
| 2017/0068939 A1 | 3/2017 | Groarke et al. |
| 2017/0103387 A1* | 4/2017 | Weber ............... G06Q 20/02 |
| 2018/0375955 A1* | 12/2018 | Ferenczi ............ H04L 63/102 |

OTHER PUBLICATIONS

Quality aware transcoding: An application level technique to dynamically adapt multimedia content by Chandra, Surendar. Duke University, ProQuest Dissertations Publishing, 2000. 9989166. (Year: 2000).*

Web site *design factors and usability: A navigation structure experiment by Fang, Xiang. University of Kentucky, ProQuest Dissertations Publishing, 2001. 3028017. (Year: 2001).*

* cited by examiner

SYSTEMS AND METHODS FOR PUSHING HOSTED UNIVERSAL RESOURCE LOCATOR TO MOBILE COMPUTING DEVICES

BACKGROUND

The field of the present disclosure relates generally to pushing hosted Universal Resource Locators (URLs) to mobile computing devices and, more particularly, to systems and methods for receiving a broadcasted URL signal, including the URL, at a mobile computing device, converting the broadcasted URL signal into a URL address, loading the URL address into the mobile computing device browser, and prompting a user to enter additional data into a webpage so as to initiate a payment transaction using wireless communication systems.

Over the past several years, the amount of e-commerce transactions has massively increased. Understandably, many merchants now provide virtual purchase platforms (in addition to in-person, brick-and-mortar purchase platforms), offering merchant-run websites (both desktop and mobile versions) and downloadable software applications that allow consumers to browse their stores and purchase goods. In some aspects, these digital outlets are preferable. The merchant need not maintain as many storefronts or employ as many people. Some merchants even offer online-exclusive products, services, and offers to entice consumers to make their purchases on these online purchase platforms. However, some merchants, especially merchants running small businesses, do not have the purchasing power and/or expertise to run these digital outlets. Moreover, these digital outlets may be subject to fraudulent activity if they are not securely operated.

Accordingly, a system that is affordable, easy to use, and reliable and that enables the use of these digital outlets is desirable.

BRIEF DESCRIPTION

In one aspect, a host system for pushing hosted Universal Resource Locators (URLs) to mobile computing devices is provided. The host system includes at least one host computing device that includes a processor communicatively coupled to a memory and is configured to receive first merchant data and first Internet of Technology (IOT) data associated with a merchant computing device that is associated with a merchant and is in communication with an Internet of Technology (IOT) device. The host computing device is also configured to enroll the merchant computing device using the first merchant data and the first IOT data, build, in an IOT data table, an IOT device profile using the first merchant data and the first IOT data, and generate a hosted Uniform Resource Locator (URL) associated with the merchant computing device. The host computing device is further configured to push the hosted URL, using a URL signal, to a user computing device via the IOT device, wherein the URL signal is associated with the merchant, and wherein the hosted URL is pushed when the user computing device is paired to the IOT device. The host computing device is also configured to instruct the user computing device to convert the URL signal into a URL address, wherein the URL address is configured to direct a browser of the user computing device to a URL page associated with the merchant, and instruct the user computing device to load the URL address in the browser and display the URL page to a consumer associated with the user computing device.

In another aspect, a computer-implemented method for pushing hosted Universal Resource Locators (URLs) to mobile computing devices is provided. The method is performed using a host computing device that includes at least one processor in communication with at least one memory device. The method includes receiving first merchant data and first Internet of Technology (IOT) data associated with a merchant computing device, wherein the merchant computing device is associated with a merchant and is in communication with an Internet of Technology (IOT) device. The method also includes enrolling the merchant computing device using the first merchant data and the first IOT data, building, in an IOT data table, an IOT device profile using the first merchant data and the first IOT data, and generating a hosted Uniform Resource Locator (URL) associated with the merchant computing device. The method further includes pushing the hosted URL signal, using a URL signal, to a user computing device via the IOT device, the URL signal is associated with the merchant, and wherein the hosted URL is pushed when the user computing device is paired to the IOT device. The method also includes instructing the user computing device to convert the URL signal into a URL address, wherein the URL address is configured to direct a browser of the user computing device to a URL page associated with the merchant, and instructing the user computing device to load the URL address in the browser and display the URL page to a consumer associated with the user computing device.

In yet another aspect, a non-transitory computer readable medium that includes executable instructions for pushing hosted Universal Resource Locators (URLs) to mobile computing devices is provided. When the computer executable instructions are executed by a host computing device that includes at least one processor in communication with at least one memory device, the computer executable instructions cause the host computing device to receive first merchant and first Internet of Technology (IOT) data associated with a merchant computing device that is associated with a merchant and is in communication with an Internet of Technology (IOT) device. The computer executable instructions also cause the host computing device to enroll the merchant computing device using the first merchant data and the first IOT data, build, in an IOT data table, an IOT device profile using the first merchant data and the first IOT data, and generate a hosted Uniform Resource Locator (URL) associated with the merchant computing device. The computer executable instructions further cause the host computing device to push the hosted URL, using a URL signal, to a user computing device via the IOT device, wherein the URL signal is associated with the merchant, and wherein the hosted URL is pushed when the user computing device is paired to the IOT device. The computer executable instructions also cause the host computing device to instruct the user computing device to convert the URL signal into a URL address, wherein the URL address is configured to direct a browser of the user computing device to a URL page associated with the merchant, and instruct the user computing device to load the URL address in the browser and display the URL page to a consumer associated with the user computing device.

BRIEF DESCRIPTION OF THE DRAWINGS

FIG. 1 is a schematic diagram illustrating an example multi-party payment card processing system for enabling payment-by-card transactions between merchants, cardholders, and issuers.

FIG. 2 is a simplified block diagram of an example system used for pushing hosted Universal Resource Locators (URLs) to mobile computing devices.

FIG. 3 illustrates an example configuration of a user computing device shown in FIG. 2, in accordance with one embodiment of the present disclosure.

FIG. 4 illustrates an example configuration of a server system shown in FIG. 2, in accordance with one embodiment of the present disclosure.

FIG. 5 is a simplified diagram illustrating the flow of data between various components of the host system shown in FIG. 2.

FIG. 6 is a flowchart of an example method for pushing hosted URLs to mobile computing devices.

FIG. 7 illustrates an example configuration of a host computing device, in accordance with one embodiment of the present disclosure.

FIG. 8 shows a diagram of components of an example computing device that may be used in the system shown in FIG. 2 to push hosted URLs to mobile computing devices.

Like numbers in the Figures indicate the same or functionally similar components.

DETAILED DESCRIPTION

Figure 1:
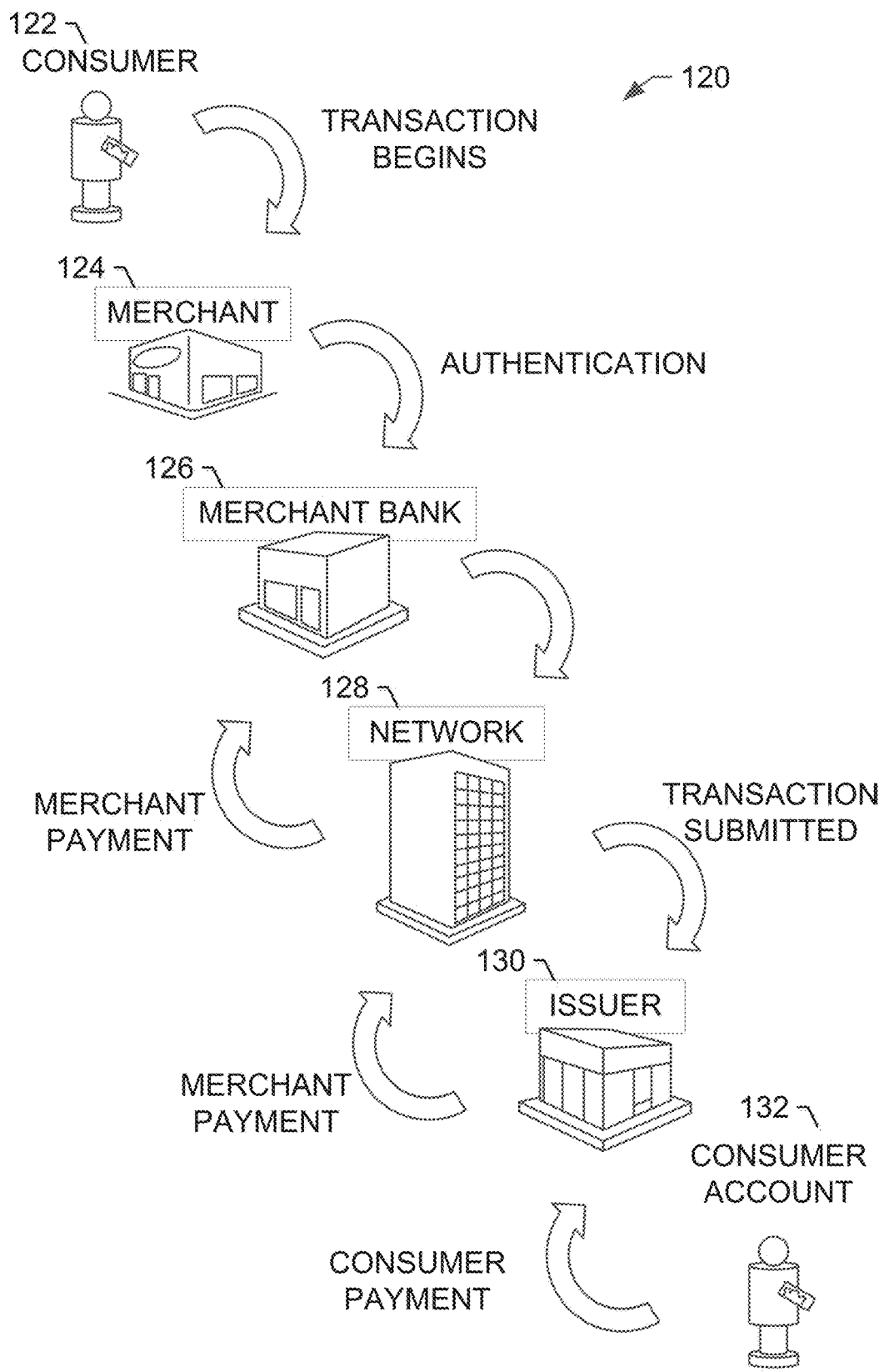
FIGS. 1-8 show example embodiments of the methods and systems described herein.

The host system described herein includes at least one host computing device, at least one merchant computing device, at least one user computing device associated with a consumer, at least one issuer computing device, and at least one payment processor. The host system further includes at least one Internet of Technology (IOT) device, such as a Raspberry Pi, BLE (Bluetooth® Low-Energy) beacons, or the like, in communication with the merchant computing device. In the example embodiment, the host computing device may be in communication with the merchant computing device, the user computing device, the issuer computing device, and the payment processor. The host computing device is configured to generate and customize a hosted Universal Resource Locator (URL) and push the hosted URL to the user computing device via the IOT device.

The IOT device broadcasts the URL in the form of a URL signal. The IOT device may broadcast the URL signal using wireless signals, such as BLE, Wi-Fi, near field communications (NFC), infrared, ZIGBEE® (e.g., ZigBee Smart Energy 1.0, ZigBee Smart Energy 2.0, ZIGBEE® is a registered trademark of ZigBee Alliance, Inc., of San Ramon, Calif.), high frequency audio waves, and/or any other known types of wireless signals. The user computing device receives the URL signal when the user computing device is at a predefined distance from the IOT device. Once the user computing device receives the URL signal, the host computing device instructs, through the URL signal, the user computing device to convert the URL signal into a URL address (e.g., http ://www.mystore.com/products/fancy-fidget-spinner or https://bit.ly/xyxa).

The host computing device also instructs, through the URL signal, the user computing device to load the URL address into the user computing device browser. The host computing device further instructs, through the URL address, the user computing device to direct the user computing device to display a customized merchant's URL webpage on the user computing device. The host computing device also instructs, through the merchant's URL webpage, the user computing device to prompt the consumer to enter additional data into a webpage associated with the merchant computing device so as to initiate a payment transaction.

The host computing device is also configured to customize the URL based on a variety of parameters. For example, the host computing device may be configured to generate a URL that is specific to a particular merchant. That is, the host computing device builds a hosted site (also referred to as "merchant's web page") that is unique for the particular merchant. The hosted site may include products and/or services the merchant offers. The hosted site may only include specific types of goods and/or services that the merchant offers (e.g., not all goods and/or services offered by the merchant are included in the hosted site). The host computing device is further configured to transmit the URL to multiple IOT devices in communication with the merchant computing device. The host computing device may configure each IOT device to receive a particular URL associated with specific types of goods and/or services.

For example, a merchant may offer deluxe candy and regular candy. To simplify the list of candies a consumer may see in the merchant's hosted site, the merchant may use one IOT device for the deluxe candy and another IOT device for the regular candy. The host computing device is configured to transmit a URL to each IOT device and each IOT device is configured to broadcast a URL signal to a user computing device associated with the consumer. The host computing device instructs, through the URL signal, the user computing device to convert each URL signal into a URL address, and to load each URL address into the user computing device browser. In this example, the user computing device loads two URL addresses that the user may access in different tabs of the user computing device browser. Then, the host computing device instructs, through the URL address, the user computing device to direct the user to the customized merchant's webpage used for offering and selling the merchant's good(s) and/or service(s).

The host computing device includes a processor in communication with a memory. The host computing device is further in communication with at least one database for storing information, such as consumer identifiers and/or consumer account identifiers, which identify a consumer account and all payment methods (e.g., physical card, chip card, user computing device) associated with that payment account. The consumer account identifiers may include device identifiers associated with each payment method, such as a phone number, an email address, a primary account number (PAN), a token, a user computing device identifier, or other similar contact information associated with the user computing device or the consumer. In the example embodiment, as some of the information stored in the database may include personally identifiable information (PII), any stored PII is encrypted to prevent unauthorized access to the PII. Moreover, in any embodiments in which PII may be collected, the consumer from which the PII may be collected is provided an opportunity to agree to or deny collection of such data.

The host computing device is further configured to push the hosted URL to the user computing device via the TOT device and receive purchase data from the user computing device and the merchant computing device. The purchase data may include payment transactions initiated by a consumer using a payment device (e.g., a payment card, digital wallet, mobile payment, etc.) associated with a particular transaction processing network. That is, the purchase data may include, among other data points, data associated with the consumer and the merchant involved in the payment transaction. For example, the purchase data may include one or more of: a consumer identifier, consumer biometric data, a merchant identifier, a merchant computing device identifier, consumer account data, a transaction amount, a time and date of the transaction, data descriptive of the purchase, a location of the transaction, and Internet of Technology (IOT) data. The host computing device is in communication with a database that stores data related to the payment transactions, such as purchase data and transaction data. The host computing device is also configured to perform a lookup within the database to retrieve stored account data and compare the stored account data to the purchase data.

The stored account data may include consumer account information, such as credit card or debit card information (e.g., a PAN an expiration date, a card verification value (CVV), or the like), an encrypted consumer address, an encrypted date of birth, and historical purchase data. Once the host computing device has retrieved the stored data, the host computing device compiles the purchase data and the stored account data, and generates transaction data. The transaction data may include the stored account data and the purchase data. In general, the stored account data included in the transaction data is the matched data from the comparison of the stored data to the purchase data. The host computing device is further configured to transmit the transaction data to the payment processor, which processes payment transactions using the transaction data. In the example embodiment, the host computing device includes the transaction data in an authorization request message (e.g., ISO 8583 message). The host computing device is also configured to generate and transmit the authorization request message to an issuer bank.

The host computing device is further configured to generate a URL associated with a merchant registered to a URL hosted site service. A merchant may register for the service by accessing the host computing device via a network, such as the Internet. At the time of registration, the merchant may provide some merchant data, such as the merchant's business address, the merchant's business name, the merchant's segment of sales (e.g., type of goods and/or service that the merchant sells), and/or any other information related to the merchant and the merchant's business. Additionally, at the time of registration of the merchant, the host computing device may assign to the merchant a merchant identifier and a merchant computing device identifier to the merchant computing device. The host computing device may also capture the merchant computing device Internet Protocol (IP) address and/or other data associated with the merchant computing device. During and/or after registration, the host computing device stores the information assigned to and captured from the merchant and merchant computing device.

The host computing device is also configured to receive a geolocation of the merchant computing device along with the purchase data. The geolocation is captured and transmitted to the merchant computing device by the TOT device. In one example, once the host computing device receives the geolocation, the host computing device may compare the received geolocation to a stored geolocation. The host computing device uses the comparison to determine whether the merchant computing device is an authorized registered merchant computing device in the URL hosted site service. In one embodiment, a merchant associated with the merchant computing device may access the host computing device to indicate a location where the merchant computing device is and/or is going to be located. The host computing device is configured to perform the comparison using the indicated location. In another embodiment, the host computing device is configured to perform the comparison using a stored default location associated with the merchant computing device. In yet another embodiment, the host computing device is configured to perform the comparison using a location associated with an TOT device profile (as explained in greater detail below).

In another example, the host computing device may determine that the merchant computing device is an authorized registered merchant computing device by comparing the merchant identifier included in the purchase data to a stored merchant identifier. In yet another example, the host computing device may determine that the merchant computing device is an authorized registered merchant computing device by comparing the merchant computing device identifier in the purchase data to a stored merchant computing device identifier. In another example, the host computing device may use other purchase data associated with the merchant in order to determine that the merchant computing device is an authorized registered merchant computing device.

If the merchant computing device is registered and authorized, the host computing device transmits an approval response message to the merchant computing device and process the payment transaction. The host computing device may additionally transmit consumer data included in the purchase data, such as the consumer identifier, the consumer biometric data, or the like, to an issuer. The issuer may use this data to confirm that the consumer is authorized to perform the transaction.

In the example embodiment, the host computing device may build rules around the IOT device. That is, the host computing device collects IOT data from the IOT device via the merchant computing device, stores the IOT data within a database, retrieves the stored IOT data, builds a profile for the IOT device, and stores the profile in an Internet of Technology (IOT) data table. The IOT data may include a merchant computing device geolocation, a time the merchant computing device is at that geolocation, a user computing device geolocation, number of user computing devices in communication and/or that have been in communication with the IOT device, user computing device identifiers for each user computing device that is in communication or has been in communication with the IOT device, an IOT device identifier, and other IOT data that the host computing device may require. During and/or after collecting the IOT data, the host computing device may store the IOT data within a database in communication with the host computing device.

The IOT device profile may indicate the most frequent times that the IOT device is at a specific location. This profile may also indicate which times are busy or slow for the merchant. For example, if at some time during a day none or few user computing devices are in communication with the IOT device, the host computing device may determine that the time is a slow time. Conversely, if at some time during that day a large amount of user computing devices are in communication with the IOT device, the host computing device may determine that the time is a busy time. The host computing device may be configured to use the IOT device profile and/or other data to determine that the merchant computing device is an authorized registered merchant computing device in the URL hosted site service. For example, if the host computing device compares the received IOT data to the stored IOT data and matches the received IOT data with the stored IOT data, the host computing device determines that the merchant computing device is an authorized registered merchant computing device in the URL hosted site service.

In the example embodiment, a consumer may have a payment account (e.g., a credit card, debit card account, or the like) for which a physical payment card has been issued. As used herein, a "consumer" is a consumer having a payment card (e.g., a credit card, debit card, prepaid card, etc.) associated with a particular payment processing network (also referred to herein as a "transaction processing network") and/or another payment device with electronically stored account or payment details, such as a digital wallet or mobile payment service. In one example, the consumer has a user computing device associated with the payment account. The consumer visits a merchant location and the merchant associated with the merchant location uses an IOT device in communication with a merchant computing device. The host computing device is configured to transmit a URL to the user computing device, via the IOT device. The URL includes a list of goods and/or services that the merchant offers. In some embodiments, the URL also includes the price for each good and/or service included in the list. The IOT device obtains this list from the host computing device via the merchant computing device. The transmission is initiated when the IOT device detects the user computing device. In order for the user computing device to receive the transmission, the user computing device requires being detectable by the IOT device. The user computing device is detectable if one or more of its wireless communication applications, such as BLE, Wi-Fi, near field communications (NFC), infrared, ZIGBEE®, high frequency audio waves, or the like, is active.

In the example embodiment, the consumer is nearby a merchant location. Once the IOT device detects the user computing device, the IOT device may broadcast a notification, via a URL signal, to the user computing device. The notification may include a request to exchange data. If the consumer accepts the request, the IOT device pairs with the user computing device. In other embodiments, once the IOT device detects the user computing device, the IOT device automatically pairs with the user computing device. After paring, the IOT device is configured to broadcast a URL to the user computing device in the form of a URL signal. When the user computing device receives the URL signal, the host computing device instructs, through the URL signal, the user computing device to convert the URL signal into a URL address and to load the URL address into the user computing device browser. In some embodiments, the user computing device may display the loaded URL address in the form of a list. In other embodiments, the user computing device may display the loaded URL address in any suitable form that enables the consumer to select the goods and/or services that the merchant offers and make a payment for the selected goods and/or services on the user computing device. The URL address enables the consumer to initiate a payment transaction from the user computing device.

Once the URL address is loaded, the consumer is able to see a merchant's URL webpage and select one or more goods and/or services that the merchant offers. In one example, the consumer enters payment details (i.e., the consumer's account information) into the merchant's URL webpage once the consumer has selected the goods and/or services desired to be purchased, and the user computing device transmits the information to the IOT device. In another example, the account information is stored in the user computing device. The user computing device may automatically enter such information in to the merchant's URL webpage. Once the account information is entered, the user computing device is configured to generate purchase data using the account information, the selected goods and/or services, and merchant data, and to transmit the purchase data to the IOT device. The IOT device then transmits the data to the merchant computing device. In some embodiments, the merchant computing device transmits the purchase data to the host computing device. In other embodiments, the user computing device transmits the purchase data to the host computing device.

In certain embodiments, the IOT device is at an attended merchant location. That is, a merchant (e.g., at least a person or a machine, such as a robot) is present and attending the location. The merchant computing device receives the purchase data and displays to the merchant the goods and/or services selected by the consumer. Along with the consumer's selection, the merchant computing device may display the consumer identifier included in the purchase data that enables the merchant to identify the consumer in order for the merchant to provide the goods and/or services to the consumer. The merchant may request the consumer to provide the user computing device or other type of identifier (e.g., a payment card associated with the consumer identifier transmitted) that identifies the consumer as the consumer that selected the goods and/or services.

In other embodiments, the IOT device is at an unattended merchant location. That is, a merchant is not at the location. The merchant computing device receives the purchase data and based on the selection submitted by the consumer, the merchant computing device selects the goods and/or services that the consumer selected. In one example, the IOT device may be embedded in the merchant computing device. For instance, the merchant computing device may be a vending machine. Once the IOT device receives the consumer's selection, the IOT device may instruct the vending machine to release a product upon the payment of the consumer is approved. In another example, the IOT device may be embedded in another type of merchant computing device, such as a parking meter and/or a toll booth. Once the IOT device receives the consumer's selection (e.g., time the consumer desires to park and/or zone number), the IOT device may transmit the selection to the parking meter upon approval of the consumer payment. In yet another example, the IOT device is a standalone device that communicates with the merchant computing device.

In the example embodiment, the consumer attempts to make a purchase (e.g., a payment transaction) at a merchant location from their user computing device. The consumer enters the consumer account information, such as credit card or debit card information (e.g., a PAN, an expiration date of the card, a card verification value (CVV) of the card, or the like), during a checkout process on the merchant's URL page to purchase the items selected in the merchant's URL page. When the consumer submits the purchase data, a merchant server associated with the merchant computing device may transmit an authorization request message. The user computing device or the merchant computing device may generate an authorization request message using the purchase data. The authorization request message may include the purchase data, a consumer authentication request, a user computing device authentication request, and/or a merchant computing device authentication request. If the authorization request message includes at least one authentication request, the authorization request message may be transmitted to and received by an authentication service. For example, some known payment networks engage an authentication service, such as a 3-D Secure®

(Visa International Service Association, Delaware) (3DS) protocol (e.g., Mastercard SecureCode® (Mastercard International Incorporated, Purchase, N.Y.)) that performs an authentication of a consumer and/or a merchant prior to authorization of the transaction.

In the example embodiment, the merchant computing device identifier, which may be formatted as an extension to an authentication protocol, identifies the merchant computing device from which the payment transaction is initiated. Accordingly, in some cases, the merchant computing device identifier may include device information associated with the IOT device and/or the user computing device. IOT device information may include information associated with the user computing device used during initiation of the payment transaction, such as a unique hardware identifier, or an IP address associated with the device. The authorization request message may further include a "cart identifier" (or "cart ID"), which is a unique token associated with the item selected by the consumer on the merchant's URL page (e.g., the particular items being purchased, the particular step in the checkout process at which the authorization request message was initiated, profile information for a profile associated with the merchant, and the like).

In some embodiments, the host computing device may be associated with an authentication service, the payment processor, or an issuer bank. The host computing device is configured to receive the authorization request message, for example, from a payment processor included within the payment processing network or from the merchant computing device, through an Application Programming Interface (API), which communicatively couples the merchant computing device and/or the payment processor to the host computing device. The host computing device receives the authorization request message including the user computing device identifier, the consumer identifier, and the merchant computing device identifier. Using, for example, a lookup table, such as the IOT data table, the host computing device may determine that the merchant computing device is a registered and authorized merchant computing device. Using the same table, the host computing device may also determine that the consumer is authorized to perform the payment transaction.

For example, the host computing device may compare the stored biometric data associated with the consumer and the biometric data included in the purchase data as part of authorization request message. Further, the host computing device may use merchant-specific or issuer-specific rules to determine that the merchant computing device is registered and authorized to perform the transaction and the consumer is authorized to perform the transaction. In some embodiments, the host computing device returns an approval response message to the merchant computing device and/or the user computing device once the host computing device determines that the merchant computing device is an authorized and registered merchant computing device in the URL hosted site service, and the consumer is authorized to perform the payment transaction (e.g., the legitimate cardholder).

In some embodiments, the host computing device is configured to apply rules that enable temporary access to the merchant's URL page. That is, consumers may not access the merchant's URL page after a predefined time period (e.g., only business hours). The predefined time period may be configured by a merchant and/or a user for the host computing device. For example, the merchant may want to allow purchases through the merchant's URL page only for a given day. The merchant's URL page is active only on that specific day. If a consumer visits that page on another day (e.g., the merchant's URL page may be stored in the history of the consumer's user computing device browser), the user computing device browser would display an error message indicating, for example, that the merchant's URL page is not available, the merchant location is currently not open, and/or the merchant's product and/or services are not available. If a consumer is able to access the merchant's URL page after the predefined period of time, the host computing device is configured to identify the consumer as performing fraudulent activity. The host computing device is also configured to send a fraud alert to the merchant, an issuer bank, and/or an acquiring bank and may block the merchant's URL page.

In other embodiments, the host computing device is configured to apply rules that enable access to the merchant's URL page based on a predefined distance between the IOT device and a user computing device. The predefined distance may be configured by a merchant and/or a user of the host computing device. For example, a consumer may be at the merchant location and may access the merchant's URL page. The consumer may or may not purchase a product and/or service offered by the merchant. In this embodiment, once the consumer leaves the merchant location, the consumer may not access the merchant's URL page. If the consumer attempts to access the merchant's URL page, the consumer's user computing device displays an error indicating, for example, that the merchant's URL page is not available and/or the consumer is not in the merchant location or nearby this location. If a consumer is able to access the merchant's URL not within the predefined distance, the host computing device is configured to identify the consumer as performing fraudulent activity. The host computing device is also configured to send a fraud alert to the merchant, an issuer bank, and/or an acquiring bank and may block the merchant's URL page.

At least one of the technical problems addressed by this system includes: (i) required installment of an application in a user computing device to access a merchant's URL webpage; (ii) required manual entry of a URL location in order to access a merchant's URL webpage; and (iii) inability to detect possible fraudulent activity based on the geolocation of the merchant computing device.

A technical effect of the systems and processes described herein is achieved by performing at least one of the following steps: (a) receiving first merchant data and first Internet of Technology (TOT) data associated with a merchant computing device that is associated with a merchant and is in communication with an Internet of Technology (TOT) device; (b) enrolling the merchant computing device using the first merchant data and the first TOT data; (c) building, in an TOT data table, an TOT device profile using the first merchant data and the first TOT data; (d) generating a hosted Uniform Resource Locator (URL) associated with the merchant computing device; (e) pushing the hosted URL, using a URL signal, to a user computing device via the TOT device, wherein the URL signal is associated with the merchant, and wherein the hosted URL is pushed when the user computing device is paired to the TOT device; (f) instructing the user computing device to convert the URL signal into a URL address, wherein the URL address is configured to direct a browser of the user computing device to a URL page associated with the merchant; and (g) instructing the user computing device to load the URL address in the browser and display the URL page to a consumer associated with the user computing device.

As used herein, the term "authentication" (or an "authentication process") is used generally to refer to a process conducted on a payment transaction prior to the "authorization" of a transaction (or an "authorization process"). At least one purpose of the authentication process is to evaluate whether or not the person conducting the transaction is actually a person privileged to use the payment card presented in the transaction. An authentication process may be used to reduce fraudulent transactions, and thus protect one or more parties to the transaction (e.g., the merchant, or the issuer of the payment card).

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," "payment card," and "payment device" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), wearable computing devices, key fobs, digital wallets, and/or computers. Each type of transactions card can be used as a method of payment for performing a transaction. As used herein, the term "payment account" is used generally to refer to the underlying account with the payment device. In addition, consumer behavior can include but is not limited to purchases, management activities (e.g., balance checking), bill payments, achievement of targets (meeting account balance goals, paying bills on time), and/or product registrations (e.g., mobile application downloads).

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment card processing system 120 for enabling payment-by-card transactions between merchants 124, consumers 122, and issuer 130. Embodiments described herein may relate to a transaction card system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are registered with Mastercard International Incorporated®. (Mastercard is a registered trademark of Mastercard International Incorporated located in Purchase, N.Y.).

In the payment card processing system, a financial institution called the "issuer" issues a transaction card or electronic payments account identifier, such as a credit card, to a consumer or consumer 122, who uses the transaction card to tender payment for a purchase from a merchant 124. To accept payment with the transaction card, merchant 124 must normally establish an account with a financial institution that is part of the financial payment system. This financial institution is usually called the "merchant bank," the "acquiring bank," or the "acquirer." When consumer 122 tenders payment for a purchase with a transaction card, merchant 124 requests authorization from a merchant bank 126 for the amount of the purchase. The request may be performed over the telephone, but is usually performed through the use of a point-of-sale terminal, which reads consumer's 122 account information from a magnetic stripe, a chip, or embossed characters on the transaction card and communicates electronically with the transaction processing computers of merchant bank 126. Alternatively, merchant bank 126 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 128, computers of merchant bank 126 or merchant processor will communicate with computers of an issuer 130 to determine whether consumer account 132 associated with consumer 122 is in good standing and whether the purchase is covered by consumer's 122 available credit line. Based on these determinations, the request for authorization will be declined or accepted. If the request is accepted, an authorization code is issued to merchant 124.

When a request for authorization is accepted, the available credit line of consumer account 132 is decreased. Normally, a charge for a payment card transaction is not posted immediately to consumer account 132 because bankcard associations, such as Mastercard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If consumer 122 cancels a transaction before it is captured, a "void" is generated. If consumer 122 returns goods after the payment transaction has been captured, a "credit" is generated. Interchange network 128 and/or issuer 130 stores the transaction card information, such as a category of merchant, a merchant identifier, a location where the transaction was completed, amount of purchase, and date and time of transaction, in a database 220 (shown in FIG. 2).

After a purchase has been made, a clearing process occurs to transfer additional transaction data related to the purchase among the parties to the transaction, such as merchant bank 126, interchange network 128, and issuer 130. More specifically, during and/or after the clearing process, additional data, such as a time of purchase, a merchant name, a type of merchant, purchase information, consumer account information, a type of transaction, information regarding the purchased item and/or service, and/or other suitable information, is associated with a transaction and transmitted between parties to the transaction as transaction data, and may be stored by any of the parties to the transaction.

For debit card transactions, when a request for a personal identification number (PIN) authorization is approved by the issuer, consumer account 132 is decreased. Normally, a charge is posted immediately to consumer account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer 130. Settlement refers to the transfer of financial data or funds among merchant's 124 account, merchant bank 126, and issuer 130 related to the transaction. Usually, transactions are captured and accumulated into a "batch," which is settled as a group. More specifically, a transaction is typically settled between issuer 130 and interchange network 128, and then between interchange network 128 and merchant bank 126, and then between merchant bank 126 and merchant 124.

In some embodiments, consumer 122 registers one or more payment cards with a digital wallet. Having done this, consumer 122 can interact with a participating online merchant 124. At the check-out stage, online merchant 124 displays a button on the merchant website which consumer 122 can click on in order to make a payment using the consumer's 122 digital wallet. Online merchant 124 then redirects consumer 122 to a "switch" operated by interchange network 128. Using a cookie located on the consumer's 122 computer, the "switch" is able to determine which wallet-hosting server hosts a wallet associated with consumer 122. The switch then establishes a connection between consumer's 122 computer and the appropriate wallet-hosting system, which presents consumer 122 with a sign-in page (e.g., as a pop-up window), where there is an authentication process (e.g., entry of a pre-agreed password). This log-in process may use the same login credentials (e.g., password) which consumer 122 also uses to obtain access to other online banking activities.

The wallet-hosting system then securely transfers the consumer's 122 payment information to the online merchant's domain. The merchant's domain submits the consumer's 122 payment information to merchant bank 126 for a separate authorization process in which the acquiring domain communicates with the issuer 130 to ask the bank to authorize the transaction. Thus, consumer 122 is not required to enter their card details (except at the stage of initially registering with the wallet-hosting system), and the online transaction process is streamlined with only a single redirection, and consistent branding for the entire payment process, irrespective of the online merchant 124.

In some embodiments, a unique identifier is provided to consumer 122. The unique identifier is different from the number associated with consumer account 132. In these embodiments, interchange network 128 stores the unique identifier in database 220 along with consumer account 132. When interchange network 128 receives the unique identifier, interchange network 128 determines the associated consumer account 132 and uses that information in processing the payment transaction.

Figure 2:
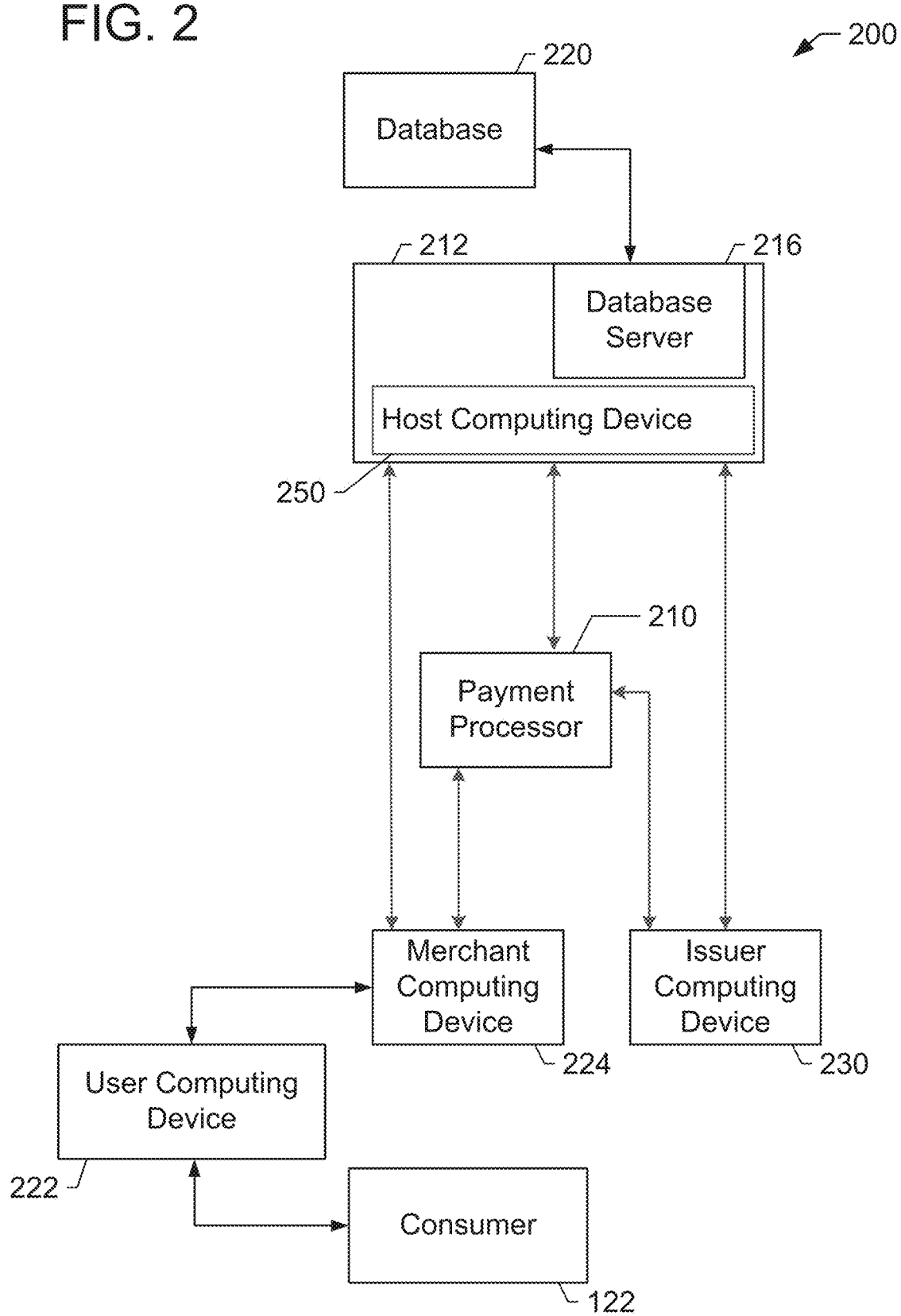

FIG. 2 is a simplified block diagram of an example host system 200, in which a variety of computing devices are communicatively coupled to each other via a plurality of network connections. These network connections may be Internet, LAN/WAN, or other connections capable of transmitting data across computing devices. Host system 200 includes host computing device 250 and database server 216. In one embodiment, host computing device 250 and database server 216 are components of server system 212. Server system 212 may be a server, a network of multiple computer devices, a virtual computing device, or the like. Host computing device 250 may be connected to at least one merchant computing device 224, and an issuer computing device 230 via at least a payment processor 210.

Database server 216 is connected to database 220, which contains information on a variety of matters, as described below in greater detail. In one embodiment, database 220 is stored on server system 212 and can be accessed by potential users of server system 212. In an alternative embodiment, database 220 is stored remotely from server system 212 and may be non-centralized. Database 220 may include a single database having separated sections or partitions or may include multiple databases, each being separate from each other. Database 220 is in communication with host computing device 250 and may store transaction data and purchase data associated with consumer account 132 (shown in FIG. 1) associated with consumer 122.

The purchase data may include payment transactions initiated by consumer 122 using a payment device (e.g., a payment card, digital wallet, mobile payment, etc.) associated with a particular transaction processing network. That is, the purchase data may include, among other data points, data associated with consumer 122 and merchant 124 (shown in FIG. 1) involved in the payment transaction. For example, the purchase data may include one or more of: a consumer identifier, consumer biometric data, a merchant identifier, a merchant computing device identifier, consumer account data, a transaction amount, a time and date of the transaction, data descriptive of the purchase, a location of the transaction, and Internet of Technology (IOT) data.

Host computing device 250 is configured to perform a lookup within database 220 to retrieve stored account data and compare the stored account data to the purchase data.

The stored account data may include consumer account information, such as credit card or debit card information (e.g., a PAN an expiration date, a card verification value (CVV), or the like), an encrypted consumer address, an encrypted date of birth, and historical purchase data. Once host computing device 250 has retrieved the stored account data, the host computing device compiles the purchase data and the stored data, and generates transaction data. The transaction data may include the stored account data and the purchase data. In general, the stored account data included in the transaction data is the matched data from the comparison of the stored data to the purchase data. Host computing device 250 is also configured to transmit the transaction data to payment processor 210, which processes payment transactions using the transaction data. In the example embodiment, host computing device 250 includes the transaction data in an authorization request message. The host computing device is further configured to generate and transmit the authorization request message to an issuer bank.

Host computing device 250 is also configured to generate a URL associated with merchant 124 registered to a URL hosted site service. Merchant 124 may register to the service by accessing host computing device 250 via a network, such as the Internet. At the time of registration, merchant 124 may provide some merchant data, such as the merchant's business address, the merchant's business name, the merchant's segment of sales (e.g., type of goods and/or service that the merchant sells), and/or any other information related to merchant 124 and the merchant's business. Additionally, at the time of registration of merchant 124, host computing device 250 may assign to merchant 124a merchant identifier and a merchant computing device identifier to merchant computing device 224. Host computing device 250 may also capture the merchant computing device Internet Protocol (IP) address and/or other data associated with merchant computing device 224. During and/or after registration, host computing device 250 stores the information assigned to and captured from merchant 124 and merchant computing device 224.

Host computing device 250 is further configured to receive a geolocation of merchant computing device 224 along with the purchase data. The geolocation is captured and transmitted to merchant computing device 124 by IOT device 510 (shown in FIG. 5). In one example, once host computing device 250 receives the geolocation, host computing device 250 may compare the received geolocation to a stored geolocation. Host computing device 250 uses the comparison to determine whether merchant computing device 224 is an authorized registered merchant computing device in the URL hosted site service. In one embodiment, a merchant 124 is associated with merchant computing device 224 and may access host computing device 250 to indicate a location where merchant computing device 224 is and/or is going to be located. Host computing device 250 is configured to perform the comparison using the indicated location. In another embodiment, host computing device 250 is configured to perform the comparison using a stored default location associated with merchant computing device 224. In yet another embodiment, host computing device 250 is configured to perform the comparison using a location associated with an IOT device profile.

In another example, host computing device 250 may determine that merchant computing device 224 is an authorized registered merchant computing device by comparing the merchant identifier included in the purchase data to a stored merchant identifier. In yet another example, host computing device 250 may determine that merchant computing device 224 is an authorized registered merchant computing device by comparing the merchant computing device identifier in the purchase data to a stored merchant computing device identifier. In another example, the host computing device may use other purchase data associated with merchant 124 in order to determine that merchant computing device 224 is an authorized registered merchant computing device.

If merchant computing device 224 is registered and authorized, host computing device 250 transmits an approval response message to merchant computing device 224 and processes the payment transaction. Host computing device 250 may additionally transmit consumer data included in the purchase data, such as the consumer identifier, the consumer biometric data, or the like, to an issuer computing device 230. Issuer computing device 230 may use this data to confirm that consumer 122 is authorized to perform the transaction.

In the example embodiment, host computing device 250 may build rules around IOT device 510. That is, host computing device 250 collects IOT data from IOT device 510 via merchant computing device 224, stores the IOT data within database 220, retrieves the stored IOT data, builds a profile for IOT device 510, and stores the profile in an IOT data table 728 (shown in FIG. 7). The IOT data may include a merchant computing device 224 geolocation, a time merchant computing device 224 is at that geolocation, user computing device 222 geolocation, number of user computing devices 222 in communication and/or that have been in communication with IOT device 510, user computing device identifiers for each user computing device 222 that is in communication or has been in communication with IOT device 510, an IOT device identifier, and other IOT data that host computing device 250 may require from IOT device 510. During and/or after collecting the IOT data, host computing device 250 may store the IOT data within database 220.

The IOT device profile may indicate the most frequent times that IOT device 510 is at a specific location. This profile may also indicate which times are busy or slow for merchant 124. For example, if at some time during a day none or few user computing devices 222 are in communication with IOT device 510, host computing device 250 may determine that the time is a slow time. Conversely, if at some time during that day a large amount of user computing devices 222 are in communication with IOT device 510, host computing device 250 may determine that the time is a busy time. Host computing device 250 may be configured to use the IOT device profile and/or other data to determine that merchant computing device 224 is an authorized registered merchant computing device in the URL hosted site service. For example, if host computing device 250 compares the received IOT data to the stored IOT data and matches the received IOT data with the stored IOT data, host computing device 250 determines that merchant computing device 224 is an authorized registered merchant computing device in the URL hosted site service.

In some embodiments, host computing device 250 may be associated with an authentication service, the payment processor 210, or an issuer 130 (shown in FIG. 1). Host computing device 250 is configured to receive the authorization request message, for example, from payment processor 210 included within in payment processing network, such as interchange network 128 (shown in FIG. 1), or from merchant computing device 224, through an Application Programming Interface (API), which communicatively couples merchant computing device 224 and/or payment processor 210 to host computing device 250. Host computing device 250 receives the authorization request message including a user computing device identifier, a consumer identifier, and a merchant computing device identifier. Using, for example, a lookup table, such as IOT data table 728 (shown in FIG. 7), host computing device 250 may determine merchant computing device 224 is a registered and authorized merchant computing device. Using the same table, host computing device 250 may also determine that consumer 122 is authorized to perform the payment transaction.

For example, host computing device 250 may compare the stored biometric data associated with consumer 22 and the biometric data included in the purchase data as part of authorization request message. Further, host computing device 250 may use merchant-specific or issuer-specific rules to determine that merchant computing device 224 is registered and authorized to perform the transaction and consumer 122 is authorized to perform the transaction. In some embodiments, host computing device 250 returns an approval response message to merchant computing device 224 and/or user computing device 222 once host computing device 250 determines that merchant computing device 224 is an authorized and registered merchant computing device in the URL hosted site service, and consumer 122 is authorized to perform the payment transaction (e.g., the legitimate cardholder).

Figure 3:
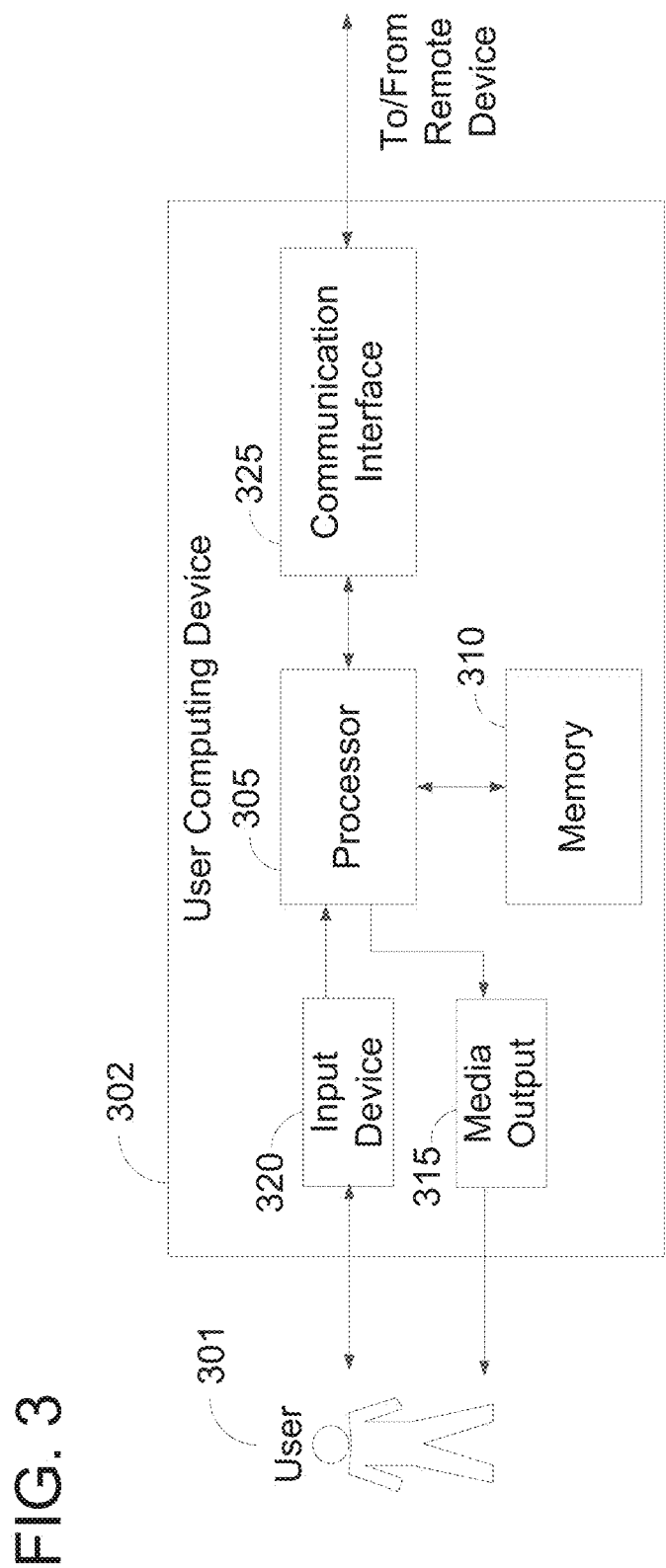

FIG. 3 illustrates an example configuration of a user system 302, such as user computing device 222 (shown in FIG. 2) configured to transmit data to host computing device 250 (shown in FIG. 2). User system 302 may include, but is not limited to, user computing device 222. In the example embodiment, user system 302 includes a processor 305 for executing instructions. In some embodiments, executable instructions are stored in a memory 310. Processor 305 may include one or more processing units, for example, a multi-core configuration. Memory 310 is any device allowing information such as executable instructions and/or written works to be stored and retrieved. Memory 310 may include one or more computer readable media.

User system 302 also includes at least one media output component 315 for presenting information to user 301. User 301 may include, but is not limited to, consumer 122 (shown in FIG. 1). Media output component 315 is any component capable of conveying information to user 301. For example, media output component 315 may be a display component configured to display component lifecycle data in the form of reports, dashboards, communications, and the like. In some embodiments, media output component 315 includes an output adapter such as a video adapter and/or an audio adapter. An output adapter is operatively coupled to processor 305 and operatively connectable to an output device such as a display device, a liquid crystal display (LCD), organic light emitting diode (OLED) display, or "electronic ink" display, or an audio output device, a speaker or headphones.

In some embodiments, user system 302 includes an input device 320 for receiving input from user 301. Input device 320 may include, for example, a keyboard, a pointing device, a mouse, a stylus, a touch sensitive panel, a touch pad, a touch screen, a gyroscope, an accelerometer, a position detector, an audio input device, a fingerprint reader/scanner, a palm print reader/scanner, a iris reader/scanner, a retina reader/scanner, a profile scanner, or the like. A single component, such as a touch screen, may function as both an output device of media output component 315 and input device 320. A single component, such as a touch screen, may function as both an output device of media output component 315 and input device 320. User system 302 may also include a communication interface 325, which is communicatively connectable to a remote device such as server system 212 (shown in FIG. 2). Communication interface 325 may include, for example, a wired or wireless network adapter or a wireless data transceiver for use with a mobile phone network (e.g., Global System for Mobile communications (GSM), 3G, 4G or Bluetooth™) or other mobile data network (e.g., Worldwide Interoperability for Microwave Access (WIMAX)).

Stored in memory 310 are, for example, computer readable instructions for providing a user interface to user 301 via media output component 315 and, optionally, receiving and processing input from input device 320. A user interface may include, among other possibilities, a web browser, and client application. Web browsers enable users, such as user 301, to display and interact with media and other information typically embedded on a web page or a website from server system 212. A client application allows user 301 to interact with a server application from server system 212.

Figure 4:
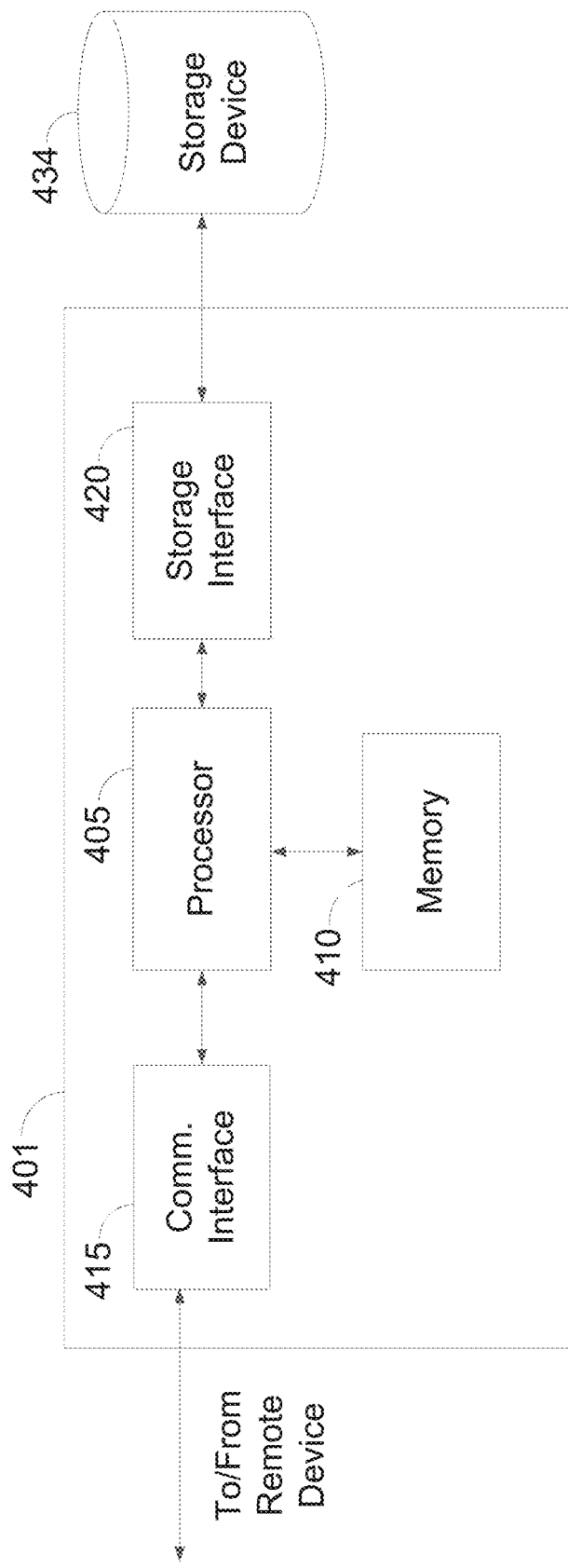

FIG. 4 illustrates an example configuration of a server system 401, such as server system 212 (shown in FIG. 2) that includes host computing device 250 (shown in FIG. 2). Server system 401 may include, but is not limited to, database server 216 (shown in FIG. 2) or host computing device 250. In some embodiments, server system 401 is similar to server system 212.

Server system 401 includes a processor 405 for executing instructions. Instructions may be stored in a memory 410, for example. Processor 405 may include one or more processing units (e.g., in a multi-core configuration) for executing instructions. The instructions may be executed within a variety of different operating systems on the server system 401, such as UNIX®, LINUX® (LINUX is a registered trademark of Linus Torvalds), Microsoft Windows®, etc. More specifically, the instructions may cause various data manipulations on data stored in storage device 434 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 405 is operatively coupled to a communication interface 415 such that server system 401 is capable of communicating with a remote device, such as a user system or another server system 401. For example, communication interface 415 may receive communications from issuer computing device via a plurality of network connections, as illustrated in FIG. 2.

Processor 405 may also be operatively coupled to a storage device 434. Storage device 434 is any computer-operated hardware suitable for storing and/or retrieving data. In some embodiments, storage device 434 is integrated in server system 401. In other embodiments, storage device 434 is external to server system 401 and is similar to database 220 (shown in FIG. 2). For example, server system 401 may include one or more hard disk drives as storage device 434. In other embodiments, storage device 434 is external to server system 401 and may be accessed by a plurality of server systems 401. For example, storage device 434 may include multiple storage units such as hard disks or solid state disks in a redundant array of inexpensive disks (RAID) configuration. Storage device 434 may include a storage area network (SAN) and/or a network attached storage (NAS) system.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Memory 410 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
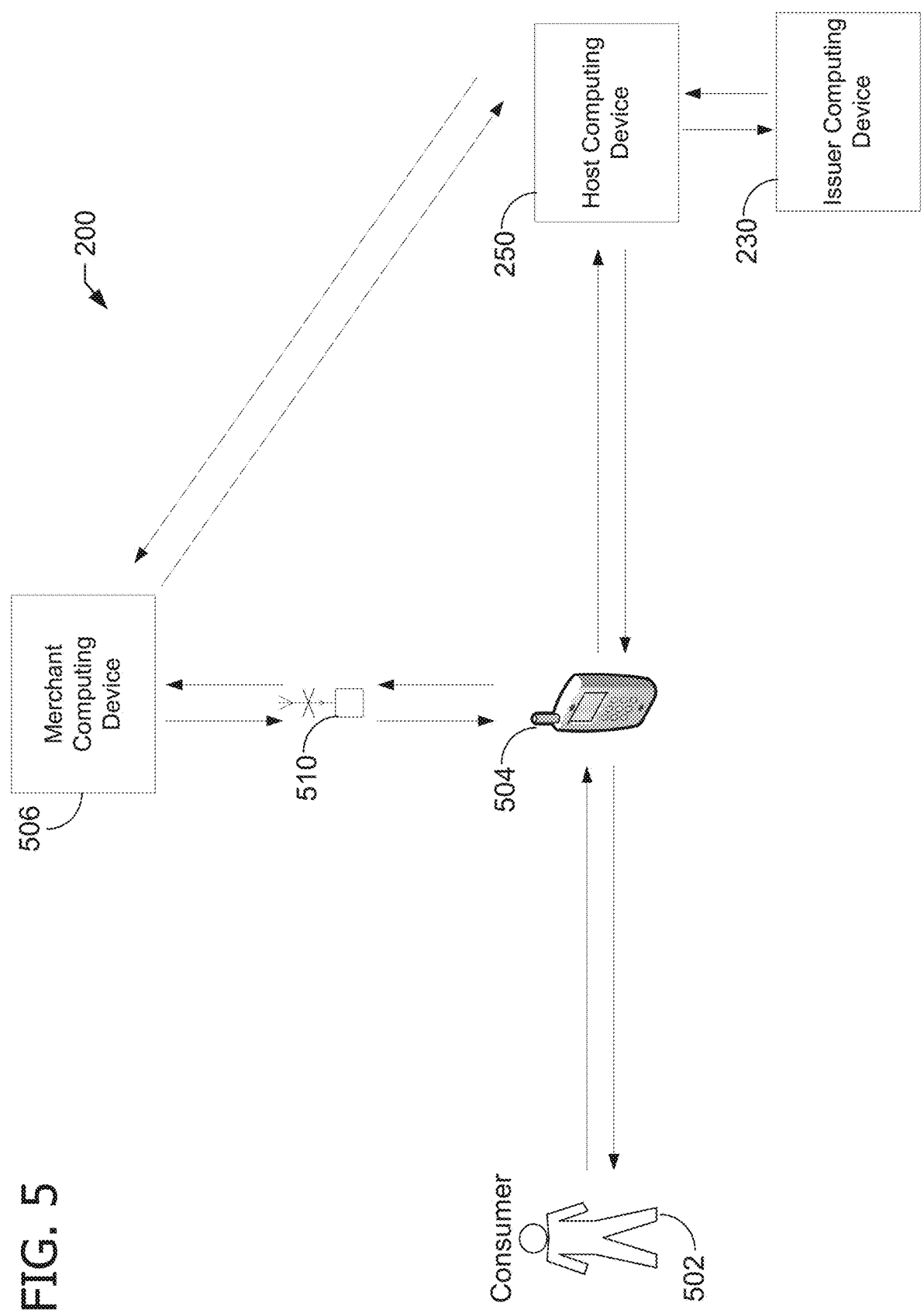

FIG. 5 is a simplified diagram illustrating the flow of data between various components of a host system 200, shown in FIG. 2. In the example embodiment, a consumer 502 (who may be similar to consumer 122, shown in FIG. 1) has a user computing device 504 (which may be similar to user computing device 222, shown in FIG. 2) associated with a consumer account 132 (shown in FIG. 1), as described above. In the example embodiment, consumer 502 visits a merchant location and merchant 124 (shown in FIG. 1) associated with the merchant location uses IOT device 510 in communication with merchant computing device 506 (which may be similar to merchant computing device 224, shown in FIG. 2). Host computing device 250 is configured to transmit a URL to user computing device 504, via IOT device 510. The URL includes a list of goods and/or services that merchant 124 offers. In some embodiments, the URL also includes the price for each good and/or service included in the list. IOT device 510 obtains this list from the host computing device via merchant computing device 506. The transmission is initiated when IOT device 510 detects user computing device 504. In order for user computing device 504 to receive the transmission, user computing device 504 requires being detectable by IOT device 510. User computing device 504 is detectable if one or more of its wireless communication applications, such as Bluetooth™, Wi-Fi, or the like, is active.

In the example embodiment, consumer 502 is nearby a merchant location. Once IOT device 510 detects user computing device 504, IOT device 510 may broadcast a notification, via a URL signal, to user computing device 504. The notification may include a request to exchange data. If consumer 502 accepts the request, IOT device 510 pairs with user computing device 504. In other embodiments, once IOT device 510 detects user computing device 504, IOT device 510 automatically pairs with user computing device 504. After paring, IOT device 510 is configured to broadcast a URL to user computing device 504 in the form of a URL signal. When user computing device 504 receives the URL signal, host computing device 250 instructs, through the URL signal, user computing device 504 to convert the URL signal into a URL address and to load the URL address into user computing device's 504 browser. In some embodiments, user computing device 504 may display the loaded URL address in the form of a list. In other embodiments, user computing device 504 may display the loaded URL address in any suitable form that enables consumer 502 to select the goods and/or services that merchant 124 offers and make a payment for the selected goods and/or services on user computing device 504. The URL address enables consumer 502 to initiate a payment transaction from user computing device 504.

Once the URL address is loaded, consumer 502 is able to see merchant's 124 URL webpage and select one or more goods and/or services that merchant 124 offers. In one example, consumer 502 enters payment details (i.e., the consumer's account information) into merchant's 124 URL webpage once consumer 502 has selected the goods and/or services desired to be purchased, and user computing device 504 transmits the information to IOT device 510. In another example, the account information is stored in user computing device 504. User computing device 504 may automatically enter such information in to merchant's 124 URL webpage. Once the account information is entered, user computing device 504 is configured to generate purchase data using the account information, the selected goods and/or services, and merchant data, and to transmit the purchase data IOT device 510. The IOT device then transmits the data to merchant computing device 506. In some embodiments, merchant computing device 506 transmits the purchase data to host computing device 250. In other embodiments, user computing device 504 transmits the purchase data to host computing device 250.

In certain embodiments, IOT device 510 is at an attended merchant location. That is, merchant 124 (e.g., at least a person or a machine, such as a robot) is present and attending the location. Merchant computing device 506 receives the purchase data and displays to merchant 124 the goods and/or services selected by the consumer 502. Along with consumer's 502 selection, merchant computing device 506 may display the consumer identifier included in the purchase data that enables merchant 124 to identify consumer 502 in order for merchant 124 to provide the goods and/or services to consumer 502. Merchant 124 may request consumer 502 to provide user computing device or other type of identifier (e.g., a payment card associated with the consumer identifier transmitted) that identifies consumer as the consumer 502 that selected the goods and/or services.

In other embodiments, IOT device 510 is at an unattended merchant location. That is, merchant 124 is not at the location. Merchant computing device 506 receives the purchase data and based on the selection submitted by consumer 502, merchant computing device 506 selects the goods and/or services that consumer 502 selected. In one example, IOT device 510 may be embedded in merchant computing device 506. For instance, merchant computing device 506 may be a vending machine. Once IOT device 510 receives consumer's 502 selection, IOT device 510 may instruct the vending machine to release a product upon the payment of consumer 502 is approved. In another example, IOT device 510 may be embedded in another type of merchant computing device, such as a parking meter and/or a toll booth. Once the IOT device receives consumer's 502 selection (e.g., time the consumer desires to park and/or zone number), IOT device 510 may transmit the selection to the parking meter upon approval of consumer 502 payment. In yet another example, IOT device 510 is a standalone device that communicates with merchant computing device 506.

In the example embodiment, consumer 502 attempts to make a purchase (e.g., a payment transaction) at a merchant location from their user computing device 504. Consumer 502 enters the consumer account information, such as credit card or debit card information (e.g., a PAN, an expiration date of the card, a card verification value (CVV) of the card, or the like), during a checkout process on merchant's 124 URL page to purchase the items selected in merchant's 124 URL page. When consumer 502 submits the purchase data, a merchant server associated with merchant computing device 506 may transmit an authorization request message. User computing device 504 or merchant computing device 506 may generate an authorization request message using the purchase data. The authorization request message may include the purchase data, a consumer authentication request, a user computing device authentication request, and/or a merchant computing device authentication request. If the authorization request message includes at least one authentication request, host computing device 250 may transmit the authorization request to an authentication service. For example, some known payment networks engage an authentication service, such as a 3-D Secure® (Visa International Service Association, Del.) (3DS) protocol (e.g., Mastercard SecureCode® (Mastercard International Incorporated, Purchase, N.Y.)) that performs an authentication of a consumer and/or a merchant prior to authorization of the transaction. Host computing device 250 may also transmit the authorization request message to issuer computing device 230. Issuer computing device 230 and/or the authentication service may transmit an authentication response message in response to the authentication request message. The authentication response message may include a denial or an approval of the payment transaction initiated by consumer 502.

Figure 6:
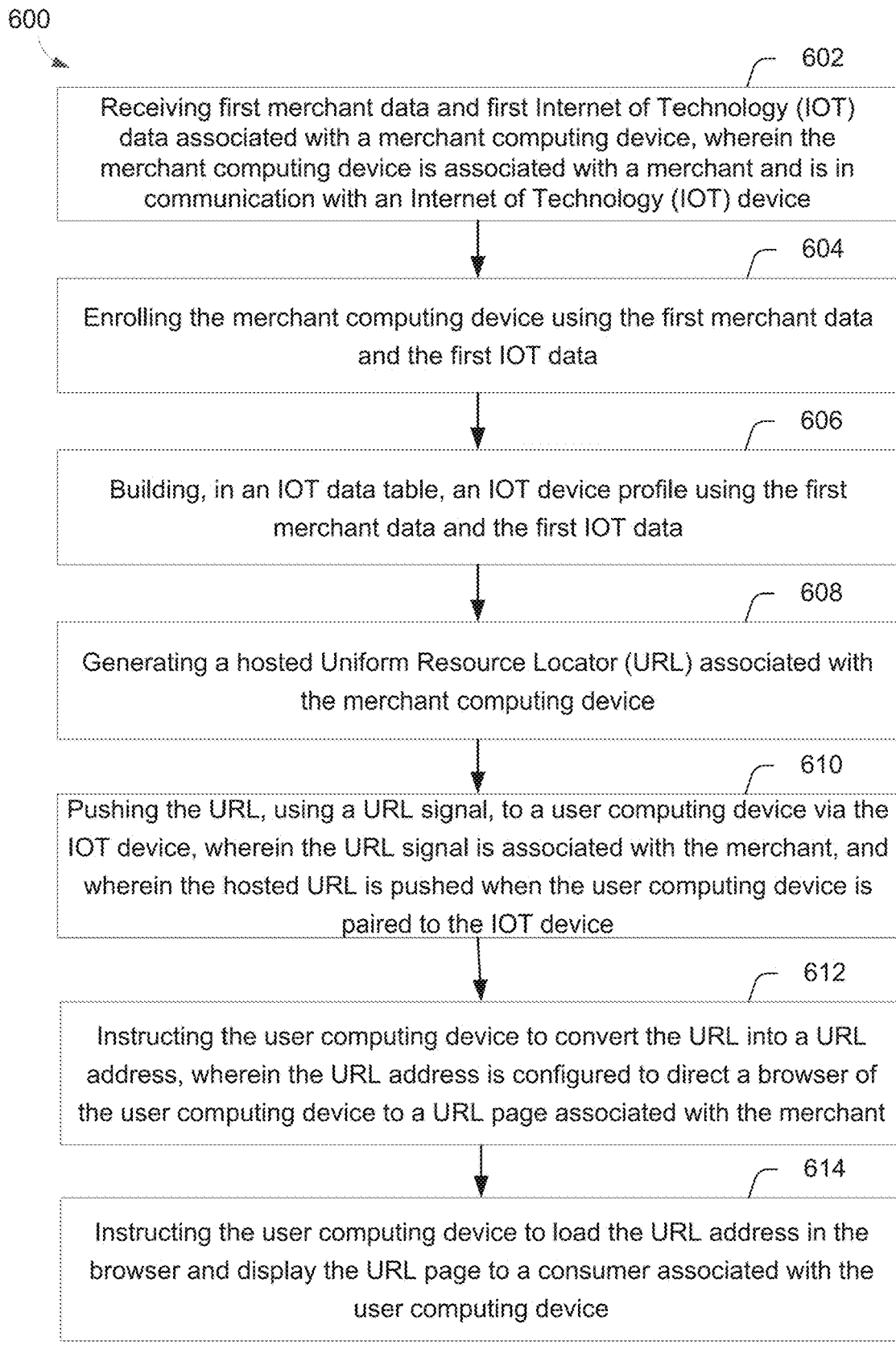

FIG. 6 is a flow chart of a process 600 for pushing hosted URLs to mobile computing devices using host system 200 shown in FIG. 2. In the example embodiment, process 600 is performed by host computing device 250 (shown in FIG. 2). Method 600 includes receiving 602 first merchant data and first Internet of Technology (IOT) data associated with a merchant computing device that is associated with a merchant and is in communication with an Internet of Technology (IOT) device. Method 600 also includes enrolling 604 the merchant computing device using the first merchant data and the first IOT data, building 606, in an IOT data table, an IOT device profile using the first merchant data and the first IOT data, and generating 608 a hosted Uniform Resource Locator (URL) associated with the merchant computing device. Method 600 further includes pushing 610 the hosted URL, using a URL signal, to a user computing device via the IOT device, wherein the URL signal is associated with the merchant, and wherein the hosted URL is pushed when the user computing device is paired to the IOT device. Method 600 also includes instructing 612 the user computing device to convert the URL signal into a URL address, wherein the URL address is configured to direct a browser of the user computing device to a URL page associated with the merchant, and instructing 614 the user computing device to load the URL address in the browser and display the URL page to a consumer associated with the user computing device.

Figure 7:
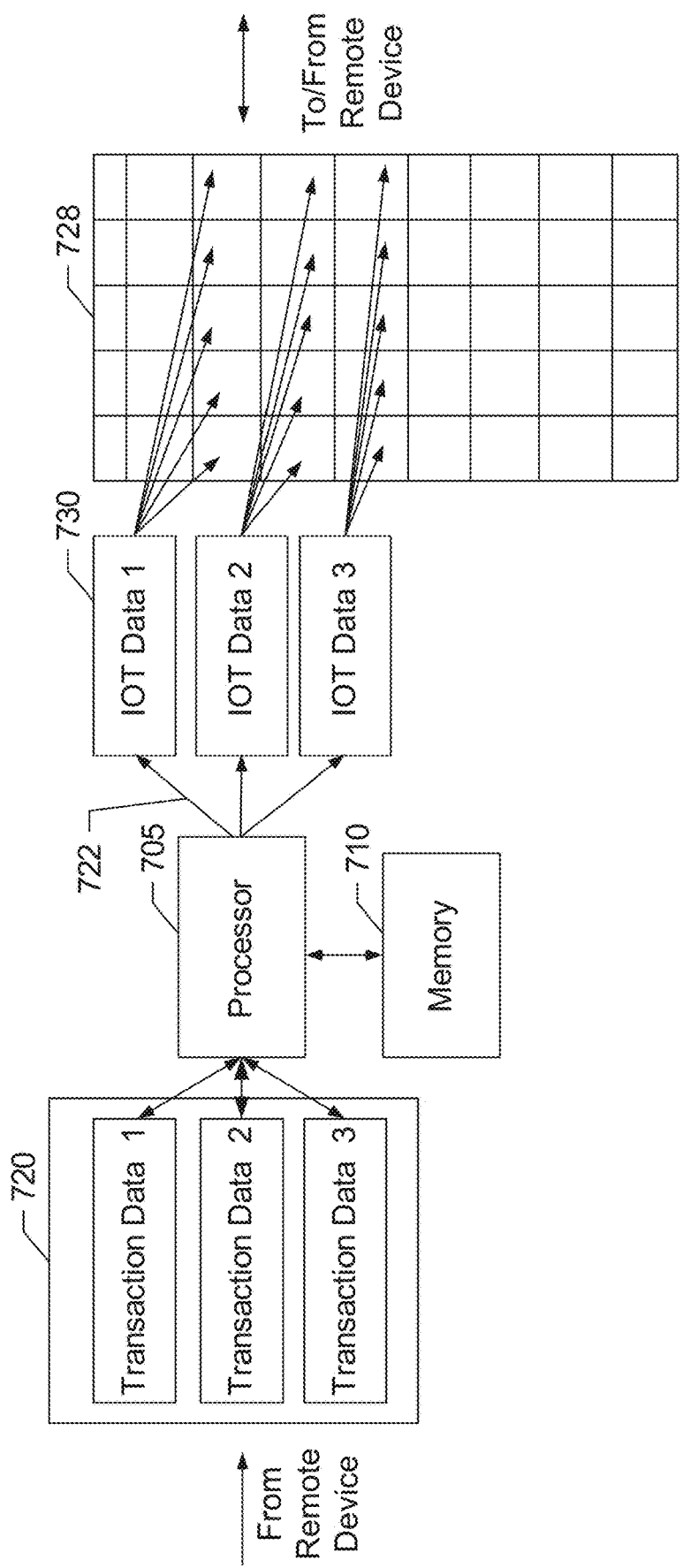

FIG. 7 illustrates an example configuration of a host computing device 250 (also shown in FIG. 2) for pushing hosted Universal Resource Locators (URLs) to mobile computing devices. Host computing device 250 may include, but is not limited to, processor 705 for executing instructions. In some embodiments, processor 705 is similar to processor 405 (shown in FIG. 4). In the example embodiment, host computing device 250 includes executable instructions that are stored in a memory area 710. Processor 705 may include one or more processing units, for example, a multi-core configuration. Memory area 710 is any device allowing information such as executable instructions and/or written works to be stored and retrieved. Memory area 710 may include one or more computer readable media.

Host computing device 250 includes a processor 705 for executing instructions. Instructions may be stored in a memory area 710, for example. Processor 705 may include one or more processing units (e.g., in a multi-core configuration) for executing instructions. The instructions may be executed within a variety of different operating systems on Host computing device 250, such as UNIX®, LINUX® (LINUX is a registered trademark of Linus Torvalds), Microsoft Windows®, etc. More specifically, the instructions may cause various data manipulations on an Internet of Technology (JOT) data table 728 (e.g., create, read, update, and delete data). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 705 is operatively coupled to a communication interface (not shown) such that host computing device 250 is capable of communicating with a remote device, such as payment processor 210 (shown in FIG. 2). For example, communication interface may receive communications from issuer computing device 230 (shown in FIG. 2) associated with issuer 130 via the Internet, as illustrated in FIG. 1.

Processor 705 may also be operatively coupled to a storage device 720. Storage device 720 is any computer-operated hardware suitable for storing and/or retrieving data. In some embodiments, storage device 720 is integrated in host computing device 250. In other embodiments, storage device 720 is external to host computing device 250 and is similar to storage device 434 (shown in FIG. 4). For example, host computing device 250 may include one or more hard disk drives as storage device 434. In other embodiments, storage device 720 is external to host computing device 250 and may be accessed by a plurality of host computing devices 250. For example, storage device 720 may include multiple storage units such as hard disks or solid state disks in a redundant array of inexpensive disks (RAID) configuration. Storage device 720 may include a storage area network (SAN) and/or a network attached storage (NAS) system.

In some embodiments, processor 705 is operatively coupled to storage device 720 via a storage interface 722. Storage interface 722 is any component capable of providing processor 705 with access to storage device 720. Storage interface 722 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 705 with access to storage device 720.

In certain embodiments, processor 705 is configured to instruct host computing device 250 to build an IOT device profile in IOT data table 728 using stored extract Internet of Technology (IOT) data. Processor 705 is also configured to instruct host computing device 250 to parse transaction data stored within storage device 720, extract the IOT data from the transaction data, and continuously update IOT data table 728 using the IOT data. Processor 705 is further configured to instruct host computing device 250 to build an IOT device profile using the IOT data. This profile may indicate the most frequent times that IOT device 510 (shown in FIG. 5) is at a specific location or that the user device is at the specific location as identified by or when paired to the IOT device 510. This profile may also indicate which times are busy or slow for merchant 124 (shown in FIG. 1). For example, if at some time during a day none or few user computing devices, such as user computing device 222 (shown in FIG. 2), are connected to IOT device 510, host computing device 250 may determine that the time is a slow time. Conversely, if at some time during that day a large amount of user computing devices are connected to IOT device 510, host computing device 250 may determine that the time is a busy time. Host computing device 250 may be configured to use the IOT device profile and/or other data to determine that merchant computing device 224 (shown in FIG. 2) is an authorized registered merchant computing device in the URL hosted site service. For example, if host computing device 250 compares the received IOT data to the stored IOT data and matches the received IOT data with the stored IOT data, host computing device 250 determines that merchant computing device 224 is an authorized registered merchant computing device in the URL hosted site service.

Processor 705 may also instruct host computing device 250 to update IOT data table 728 every time the transaction data associated with a stored IOT device profile is received.

Memory area 710 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 8:
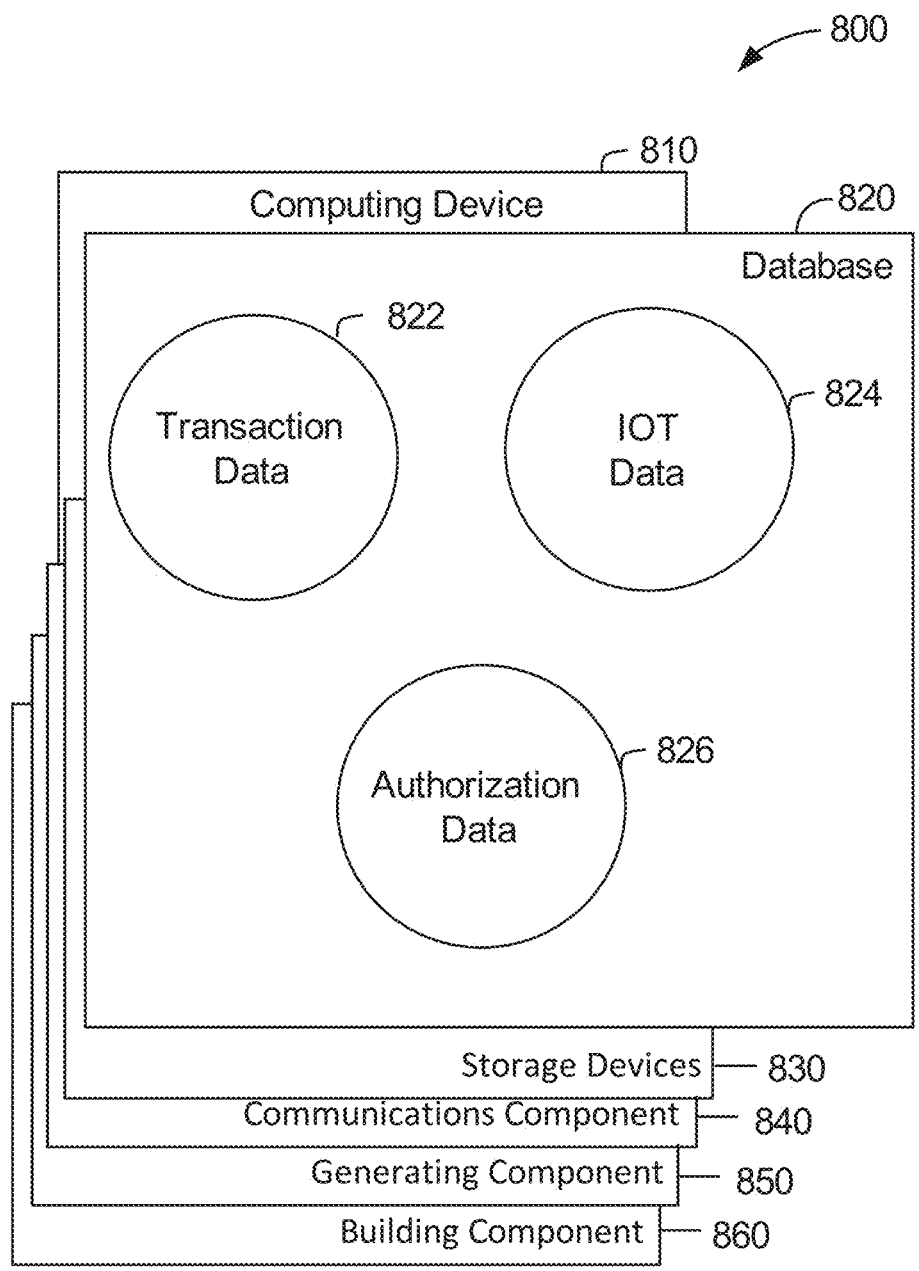

FIG. 8 is a diagram 800 of components of one or more example computing devices that may be used in host system 200 shown in FIG. 2. In some embodiments, computing device 810 is similar to host computing device 250 (shown in FIG. 2). Database 820 may be coupled with several separate components within computing device 810, which perform specific tasks. In this embodiment, database 820 includes transaction data 822, IOT data 824, and authorization data 826. In some embodiments, database 820 is similar to database 220 (shown in FIG. 2).

Computing device 810 includes database 820, as well as data storage devices 830. Computing device 810 also includes a communications component 840 for receiving 602 purchase data and pushing 610 (both shown in FIG. 6) a hosted URL, using a URL signal, to user computing device 222 (shown in FIG. 2) via IOT device 510 (shown in FIG. 5). Computing device 810 also includes a generating component 850 for generating 608 (shown in FIG. 6) a URL with embedded instructions for user computing device 222 and IOT device 510. Computing device 810 further includes a building component 860 for building 606 an IOT device profile in IOT data table 728 (shown in FIG. 7).

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is a flexible and secure system for various aspects of online payment transaction by pushing hosted URLs, using a URL signal, to mobile computing devices. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

In addition, although various elements of the host computing device are described herein as including general processing and memory devices, it should be understood that the host computing device is a specialized computer configured to perform the steps described herein for pushing hosted URLs, using a URL signal, to mobile computing devices.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A host system for pushing hosted Universal Resource Locators (URLs) to mobile computing devices comprising a host computing device, the host computing device comprising a processor communicatively coupled to a memory, the host computing device configured to:

receive, from a merchant computing device, first merchant data and first Internet of Technology (TOT) data associated with the merchant computing device, wherein the merchant computing device is associated with a merchant and is in communication with an Internet of Technology (TOT) device, wherein the TOT data is collected by the merchant computing device from the TOT device;

enroll the merchant computing device using the first merchant data and the first TOT data;

build, in an TOT data table, an TOT device profile using the first merchant data and the first IOT data;

generate a hosted Uniform Resource Locator (URL) associated with the merchant computing device;

push the hosted URL, using a URL signal, to the IOT device, wherein the URL signal is associated with the merchant, and wherein the hosted URL is pushed in response to the IOT device being paired to a user computing device associated with a consumer;

instruct, via the IOT device, the user computing device to convert the URL signal into a URL address, wherein the URL address is configured to direct a browser of the user computing device to a URL page associated with the merchant; and instruct, via the IOT device, the user computing device to load the URL address in the browser and display the URL page on the user computing device.

2. The host computing device of claim 1 further configured to:

receive purchase data associated with a payment transaction, wherein the purchase data includes at least a consumer identifier, a user computing device location, a second merchant data, and second IOT data; and store the purchase data within a database.

3. The host computing device of claim 2 further configured to:

parse the purchase data;

extract the second merchant data and the second IOT data from the purchase data; and compile the second merchant data and the second IOT data.

4. The host computing device of claim 2 further configured to:

update the IOT table using the second merchant data and the IOT data;

compare the first merchant data to the second merchant data; and compare the first IOT data to the second IOT data.

5. The host computing device of claim 2 further configured to:

match a merchant computing device geolocation included in the first IOT data and a merchant computing device geolocation included in the second IOT data; and match a time included in the first IOT data and a time included in the second IOT data.

6. The host computing device of claim 5 further configured to:

determine the merchant computing device is registered and authorized to perform the payment transaction based on the matching; and transmit an authorization response to the user computing device.

7. The host computing device of claim 5 further configured to:

compare a user computing device geolocation included in the second IOT data to the merchant computing device geolocation included in the second IOT data;

calculate a distance between the user computing device geolocation and the merchant computing device geolocation;

compare the calculated distance to a predefined distance; and determine the calculated distance is within the predefined distance.

8. A computer-implemented method for pushing hosted Universal Resource Locators (URLs) to mobile computing devices, said method implemented using a host computing device in communication with a memory, said method comprising:

receiving, from a merchant computing device, first merchant data and first Internet of Technology (IOT) data associated with the merchant computing device, wherein the merchant computing device is associated with a merchant and is in communication with an Internet of Technology (IOT) device, wherein the IOT data is collected by the merchant computing device from the IOT device;

enrolling the merchant computing device using the first merchant data and the first IOT data;

building, in an IOT data table, an IOT device profile using the first merchant data and the first IOT data;

generating a hosted Uniform Resource Locator (URL) associated with the merchant computing device;

pushing the hosted URL, using a URL signal, to the IOT device, wherein the URL signal is associated with the merchant, and wherein the hosted URL is pushed in response to the IOT device being paired to a user computing device associated with a consumer;

instructing, via the IOT device, the user computing device to convert the URL signal into a URL address, wherein the URL address is configured to direct a browser of the user computing device to a URL page associated with the merchant; and instructing, via the IOT device, the user computing device to load the URL address in the browser and display the URL page on the user computing device.

9. The method claim 8 further comprising:

receiving purchase data associated with a payment transaction, wherein the purchase data includes at least a consumer identifier, a second merchant data, and second IOT data; and storing the purchase data within a database.

10. The method of claim 9 further comprising:

parsing the purchase data;

extracting the second merchant data and the second IOT data from the purchase data; and compiling the second merchant data and the second IOT data.

11. The method of claim 9 further comprising:

updating the IOT table using the second merchant data and the IOT data;

comparing the first merchant data to the second merchant data; and comparing the first IOT data to the second IOT data.

12. The method of claim 9 further comprising:

matching a merchant computing device geolocation included in the first IOT data and a merchant computing device geolocation included in the second IOT data; and matching a time included in the first IOT data and a time included in the second IOT data.

13. The method of claim 12 further comprising:
determining the merchant computing device is registered and authorized to perform the payment transaction based on the matching; and
transmitting an authorization response to the user computing device.

14. The method of claim 12 further comprising:
comparing a user computing device geolocation included in the second IOT data to the merchant computing device geolocation included in the second IOT data;
calculating a distance between the user computing device geolocation and the merchant computing device geolocation;
comparing the calculated distance to a predefined distance; and
determining the calculated distance is within the predefined distance.

15. A non-transitory computer-readable storage media having computer-executable instructions embodied thereon, wherein when executed by host computing device having at least one processor coupled to at least one memory device, the computer-executable instructions cause the processor to:
receive, from a merchant computing device, first merchant data and first Internet of Technology (IOT) data associated with the merchant computing device, wherein the merchant computing device is associated with a merchant and is in communication with an Internet of Technology (IOT) device, wherein the IOT data is collected by the merchant computing device from the IOT device;
enroll the merchant computing device using the first merchant data and the first IOT data;
build, in an IOT data table, an IOT device profile using the first merchant data and the first IOT data;
generate a hosted Uniform Resource Locator (URL) signal associated with the merchant computing device;
push the hosted URL, using a URL signal, to the IOT device, wherein the URL signal is associated with the merchant, and wherein the hosted URL is pushed in response to the IOT device being paired to a user computing device associated with a consumer;
instruct, via the IOT device, the user computing device to convert the URL signal into a URL address, wherein the URL address is configured to direct a browser of the user computing device to a URL page associated with the merchant; and
instruct, via the IOT device, the user computing device to load the URL address in the browser and display the URL page on the user computing device.

16. The computer-executable instructions of claim 15 further cause the processor to:
receive purchase data associated with a payment transaction, wherein the purchase data includes at least a consumer identifier, a second merchant data, and second IOT data; and
store the purchase data within a database.

17. The computer-executable instructions of claim 16 further cause the processor to:
parse the purchase data;
extract the second merchant data and the second IOT data from the purchase data; and
compile the second merchant data and the second IOT data.

18. The computer-executable instructions of claim 16 further cause the processor to:
update the IOT table using the second merchant data and the IOT data;
compare the first merchant data to the second merchant data; and
compare the first IOT data to the second IOT data.

19. The computer-executable instructions of claim 16 further cause the processor to:
match a merchant computing device geolocation included in the first IOT data and a merchant computing device geolocation included in the second IOT data; and
match a time included in the first IOT data and a time included in the second IOT data.

20. The computer-executable instructions of claim 19 further cause the processor to:
determine the merchant computing device is registered and authorized to perform the payment transaction based on the matching; and
transmit an authorization response to the user computing device.

* * * * *